Patented July 19, 1927.

1,636,511

UNITED STATES PATENT OFFICE.

CARL HERING, OF PHILADELPHIA, PENNSYLVANIA.

FIBROUS MATERIAL AND METHOD OF MAKING THE SAME.

No Drawing. Original application filed September 2, 1924, Serial No. 735,282. Divided and this application filed January 18, 1926. Serial No. 82,157.

My invention is designed to effect the simple, rapid and economical production of extremely fine mineral fibers or filaments, particularly from difficultly fusible substances, such fibers being spun into threads and woven into fabrics which may be so treated after weaving as to eliminate stresses in the fibers and give them a natural "set" in their woven form. This application is a division of my application Serial No. 735,282, filed Sept. 2, 1924, now Patent No. 1,580,199, patented April 13, 1926.

The fineness of mineral fibers is dependent primarily upon the fusion point of the substance from which they are formed and the rapidity with which the fibers are drawn. Fibers drawn from very refractory minerals, such as quartz ($SiO_2$), corundum ($Al_2O_3$), or magnesia (MgO), having very high melting points are much finer than fibers drawn from glass, being almost invisible, yet have a tensile strength said to be greater than that of steel, possess almost perfect elasticity and great flexibility. Fabrics woven from such fibers have a higher luster, are very strong, non-absorbent, incombustible and practically imperishable. They may be disinfected or deodorized by exposure to high heat or usual antiseptics without injury, may be rendered translucent by treatment with a suitable filler or coating, and are especially suitable for use in the manufacture of the wings of aeroplanes.

The mineral substances from which fibers are formed in accordance with this invention become electrical conductors of high resistivity when heated to fusion but at normal temperatures are insulators or non-conductors of electricity. In accordance with my improvements, I utilize these characteristics of the material to generate within it, by passing an electric current therethrough, the heat necessary to maintain a liquid pool or globule of the material and to provide for the conducting liquid pool thus formed a hearth or bed preventing the destruction of the crucible or container or the short circuiting of the heating current. Preferably the liquid pool is maintained as a small globule from which one or more threads may be drawn and the bed is formed of granulated or pulverized solid material from which the globule may be replenished as threads are drawn therefrom. Any number of furnace-forming globules may be maintained in a bed of suitable size or each furnace-forming globule may be in a separate crucible or container.

The heat necessary for the initial formation of the conducting pool is preferably supplied by striking and maintaining an arc between two electrodes in contact with the granular material of the bed. As soon as the heat of the arc fuses sufficient adjacent granules or raises them to conducting temperature, the current flows through the liquid conductor thus formed and the arc is extinguished. By suitably regulating the flow of current, the heat generated by the resistivity of the liquid conductor connecting the electrodes may be raised to and maintained at any desired degree. The conversion of electrical energy into heat is instantaneous and practically 100% efficient; the heat is generated directly in the substance being treated, without the losses incident to heating by conduction or convection; and the heat losses by radiation are small since the heat passing into the bed or hearth serves to preheat and prepare the material thereof for fusion in the pool. The generation of the heat within the fused material so that the highest heat of the furnace is within and not around the liquefied material, is of great importance as it permits the drawn fibers to immediately solidify and avoids the exposure thereof to fusing temperatures after leaving the pool, thereby obviating the breakages which occur where the fusing heat is supplied from without the fused material, as by an electric arc.

A fiber of material is drawn rapidly from the fused globule, preferably by engagement with a rapidly rotating reel, and a plurality of such drawn fibers may be spun together to form a thread of desired thickness. The elasticity of such fibers is so great that it is desirable to coat them before or during spinning with a temporary adhesive to hold them in their twisted relation.

The fabric woven from such spun fibres are heated to a temperature which will soften, without melting, the fibers to eliminate stresses therein and so that the fibers when again cooled will normally maintain their woven positions, with the production of a fabric of considerable elasticity. The adhesive applied to the fibers may be burned off in this heat treatment or removed by a suitable solvent.

The fabric thus formed may be rendered translucent by impregnating or coating it with a suitable filler, such as varnish, or may be colored in any suitable manner, as by coating with pigments, exposure to light rays, or by coloring the raw material. Seams or joints in such fabrics may be made by sewing or by the use of fusible or other cements.

In the preferred practice of my process, electrodes connected in an electric circuit are embedded in a bed of granular or powdered quartz in a suitable crucible; the electrodes being initially brought sufficiently close together to form an arc immediately adjacent to the upper layer of quartz particles. When the heat of the arc has fused the globule of quartz sufficiently large to bridge over the space between the electrodes, the current will flow through the material thus rendered conducting, but of high resistivity, and heat it to any desired degree. When the globule of quartz has attained the requisite temperature, a thread is drawn therefrom by dipping therein and quickly withdrawing a cold quartz fragment, to which a filament of molten quartz adheres. The filament is thrown on the periphery of a rapidly rotating reel which may be coated with an adhesive to secure the engagement thereto of the end of the drawn fiber. The rotation of the reel at high speed draws from the globules a continuous very fine thread or fiber, which may be taken off the reel in the form of a skein.

A second thread may, in like manner, be drawn from the quartz globule and reeled upon a reel, care being taken to draw the thread from the globule at points sufficiently spaced apart to prevent adhesion or coalescence of the fibers being drawn.

The temperature of the globule may be maintained substantially constant by regulating the wattage of the current and may be maintained of substantially constant size by the addition of granulated or pulverized quartz from the bed or from any suitable source of supply.

Having described my invention, I claim:

1. The method which comprises spinning a thread from liquefied non-combustible material, fabricating cloth therefrom, and heat treating said cloth to set the threads in their fabricated positions.

2. The process which comprises spinning a flexible thread from a liquefied mineral substance, fabricating cloth therefrom and treating said cloth with a translucent filler.

3. A new article of manufacture comprising woven elastic threads set in woven form and free from stresses due to weaving.

In witness whereof I have hereunto set my name this 15th day of January, 1926.

CARL HERING.